United States Patent
Silvestri

(10) Patent No.: US 7,801,517 B2
(45) Date of Patent: Sep. 21, 2010

(54) METHODS, SYSTEMS, AND COMPUTER PROGRAM PRODUCTS FOR IMPLEMENTING A ROAMING CONTROLLED WIRELESS NETWORK AND SERVICES

(75) Inventor: Richard J. Silvestri, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 746 days.

(21) Appl. No.: 11/322,746

(22) Filed: Dec. 30, 2005

(65) Prior Publication Data

US 2007/0004403 A1    Jan. 4, 2007

Related U.S. Application Data

(60) Provisional application No. 60/695,131, filed on Jun. 29, 2005.

(51) Int. Cl.
    *H04W 24/00* (2009.01)
(52) U.S. Cl. .................. 455/423; 455/410; 455/411; 455/432.1; 455/432.2; 455/432.3; 713/168; 713/169; 713/170; 713/171; 380/247; 380/270; 380/272; 380/277; 380/278; 380/281; 380/283
(58) Field of Classification Search .................. 713/168, 713/169, 170, 171; 455/410, 411, 432.1, 455/432.2, 432.3; 380/247, 270, 272, 277, 380/278, 281, 283
See application file for complete search history.

(56) References Cited

U.S. PATENT DOCUMENTS

| | | | |
|---|---|---|---|
| 5,875,394 A * | 2/1999 | Daly et al. .................. 455/411 |
| 6,275,693 B1 * | 8/2001 | Lin et al. .................. 455/414.3 |
| 6,647,260 B2 * | 11/2003 | Dusse et al. ................. 455/419 |
| 7,266,371 B1 * | 9/2007 | Amin et al. .................. 455/419 |
| 7,389,412 B2 * | 6/2008 | Sharma et al. .............. 713/153 |
| 7,418,596 B1 * | 8/2008 | Carroll et al. ............... 713/169 |
| 7,660,420 B1 * | 2/2010 | Narayan et al. ............. 380/274 |
| 2002/0068554 A1 * | 6/2002 | Dusse ........................ 455/419 |
| 2002/0128042 A1 * | 9/2002 | Doi et al. ..................... 455/560 |
| 2003/0014646 A1 * | 1/2003 | Buddhikot et al. .......... 713/184 |
| 2004/0131188 A1 * | 7/2004 | Wang et al. .................. 380/270 |
| 2005/0165953 A1 * | 7/2005 | Oba et al. .................... 709/238 |
| 2006/0046692 A1 * | 3/2006 | Jelinek et al. ............... 455/411 |
| 2006/0052100 A1 * | 3/2006 | Almgren .................. 455/432.1 |

* cited by examiner

*Primary Examiner*—Rafael Pérez-Gutiérrez
*Assistant Examiner*—Liton Miah
(74) *Attorney, Agent, or Firm*—Cantor Colburn LLP

(57) ABSTRACT

Methods, systems, and computer program products for implementing a roaming controlled wireless network and services is provided. The method includes assigning an identifier and key to a multi-mode network-enabled communications device, the identifier and key inaccessible to an end user of the communications device. The method further includes assigning an identifier and key to a gateway device. The method further includes configuring an auto-provisioning element on each of the devices and remotely provisioning activation of roaming controlled communications services for the end user of the communications device. The remote provisioning includes transmitting a signal to one of the devices configured with the auto-provisioning element, which causes the devices to exchange identifiers and keys via a wireless local network. In response to exchanging the identifiers and keys between the devices, the communications device is permitted to communicate over the wireline network via the gateway device.

19 Claims, 4 Drawing Sheets

METHODS, SYSTEMS, AND COMPUTER PROGRAM PRODUCTS FOR IMPLEMENTING A ROAMING CONTROLLED WIRELESS NETWORK AND SERVICES

CROSS-REFERENCE TO RELATED APPLICATIONS

This application claims priority to U.S. Provisional Application No. 60/695,131, filed on Jun. 29, 2005, the contents of which are incorporated by reference herein in its entirety.

BACKGROUND

The present invention relates generally to communications systems and services, and more particularly, to methods, systems, and computer program products for implementing a roaming controlled wireless network and related services.

This application claims priority to U.S. Provisional Application No. 60/695,131, filed on Jun. 29, 2005, the contents of which are incorporated by reference herein in its entirety.

There exist a variety of choices today for implementing communications activities. This is partly because many types of communications devices that were once limited to a specific application (e.g., cell phone for voice communications) are being adapted for other uses as well (e.g., a cell phone including a digital camera and web browser application). Pagers, personal digital assistants, and similar devices are also being developed for use in a variety of different applications.

Additionally, there are a variety of types of networks and technologies used to facilitate these disparate forms of communications. Some of these network services and technologies are more costly to implement than others. Moreover, the quality of service provided may vary from network to network.

With the advent of this crossover functionality of communications devices, there is a need to provision these devices for use with various networks and services.

BRIEF SUMMARY

Exemplary embodiments include a method for implementing a roaming controlled wireless network and services. The method includes assigning an identifier and key to a multi-mode network-enabled communications device, the identifier and key being inaccessible to an end user of the communications device. The method further includes assigning an identifier and key to a gateway device, the identifier and key inaccessible to an end user of the gateway device, the gateway device in communication with a wireline network. The method further includes configuring auto-provisioning elements on each of the devices. The method further includes remotely provisioning activation of roaming controlled communications services for the end user of the communications device. The remote provisioning includes transmitting a signal to one of the devices with the auto-provisioning element, which causes the devices to exchange identifiers and keys via a wireless local network. In response to exchanging identifiers and keys between the devices, the communications device is permitted to communicate over the wireline network via the gateway device.

Additional exemplary embodiments include a system, device, and computer program product for implementing and auto-provisioning the roaming controlled wireless network and services.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, a roaming controlled wireless network system and related services are provided. The roaming controlled wireless network system enables the control of communications that are permitted for devices over a network. An auto-provisioning feature enables configuration of a communications device and corresponding access point such that the communications device and the access point exchange identifiers, e.g., private service set identifiers (SSIDs) and security keys between each other upon a request for activation of the services provided by the controlled roaming wireless network system. The auto-provisioning feature may be implemented remotely from a centralized system without any explicit action required of the end user (i.e., the user of the communications device).

Figure 1:
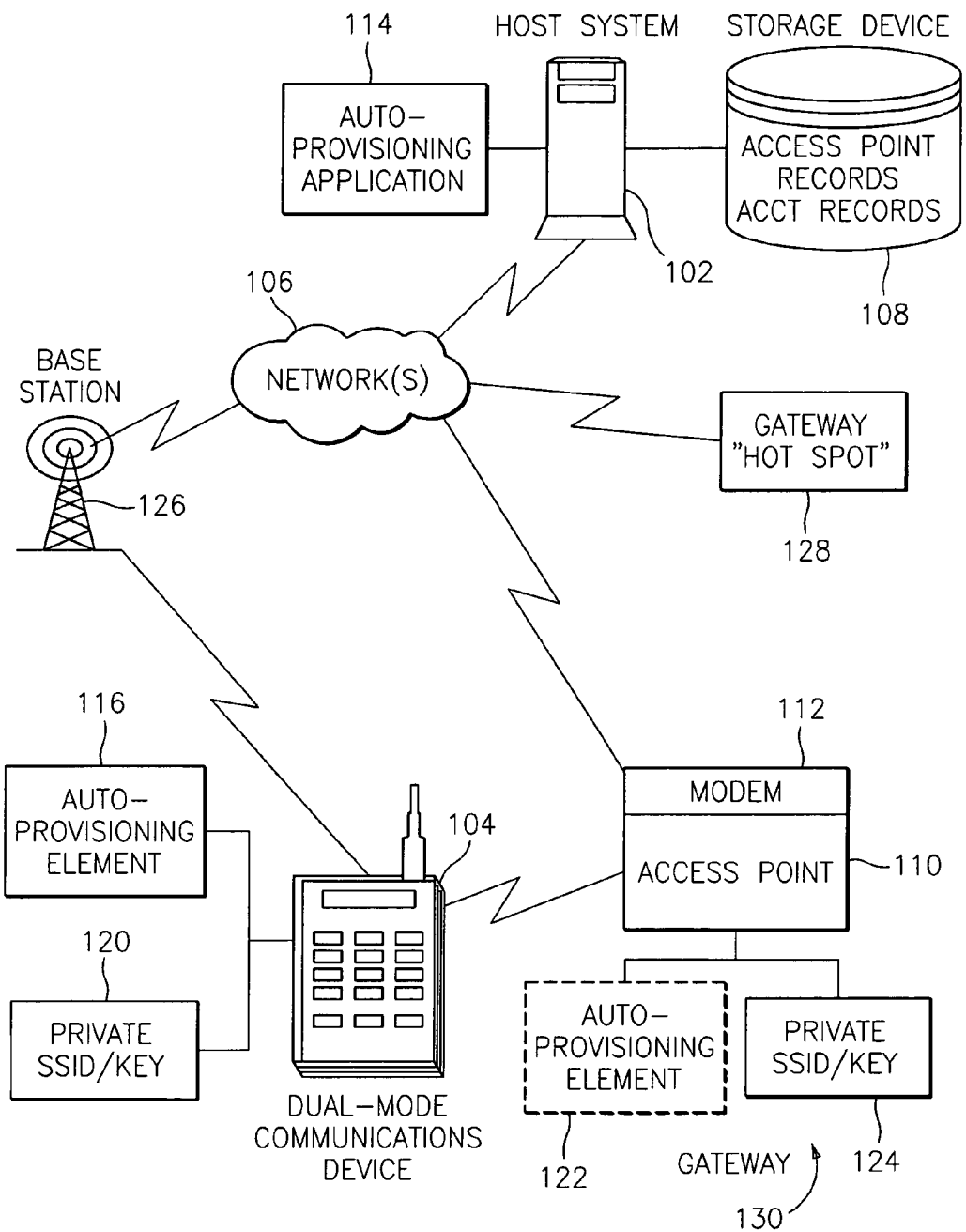
FIG. 1 is a block diagram illustrating a system upon which the roaming controlled wireless network and auto-provisioning feature may be implemented in exemplary embodiments.

Referring now to FIG. 1, an exemplary system upon which the roaming-controlled network and related services may be implemented will now be described. The system of FIG. 1 includes a host system 102 in communication with a multi-mode communications device, e.g., a dual mode communications device 104, (also referred to herein as communications device) via one or more networks, such as network(s) 106. Host system 102 may be implemented by a service provider entity that provides communications services to end users (e.g., user of communications device 104 for a fee). Host system 102 may alternatively be implemented by a third-party applications service provider (ASP) that coordinates the auto-provisioning network activities described herein on behalf of a communications service provider. The host system 102 executes one or more applications for providing the auto-provisioned, roaming-controlled wireless network services described herein. These one or more applications are referred to herein as an auto-provisioning application 114.

An operator or authorized individual of host system 102 may perform roaming control network configuration functions, as well as initiate auto-provisioning of devices (e.g., communications device 104 and gateways 128, 130) via the auto-provisioning application 114. In accordance with exemplary embodiments, the auto-provisioning application 114 includes a user interface for this purpose, a sample of which is shown and described in FIG. 3. Other applications, e.g., a web server application, may also be executed via host system 102. For purposes of illustration, host system 102 represents a communications service provider entity that provides voice, data, and application communications services via users of communications devices, such as communications device 104.

Host system 102 is in communication with a storage device 108, which is also included in the system of FIG. 1. Storage device 108 stores a variety of information in one or more databases for use by the auto-provisioning application 114. For example, information that may be stored in storage device 108 includes identifiers for networks, access points and communications devices that are serviced by the auto-provisioning system. Also, the nature of the services, including terms, conditions, pricing, etc., may also be stored in storage device 108. Storage device 108 may further store customer or account records. These items are described further herein.

While host system 102 is shown in FIG. 1 to be in direct communication with storage device 108, it will be understood that host system 102 may communicate remotely with storage device 108 over one or more networks 106.

Network(s) 106 may include multiple wireless and wireline networks (e.g., cellular and broadband). Cellular communications between wireless devices may be implemented via base station 126 and a wireless network associated with network(s) 106. Likewise, a wireless communications device (e.g., communications device 104) may communicate with another wireless communications device via a gateway 130 over a wireline network associated with networks 106, as will be described further herein.

In exemplary embodiments, wireless features of communications device 104 include wireless local area network (WLAN) components, e.g., IEEE's 802.11 standards. Communications device 104 may comprise a cellular telephone, personal digital assistant, pager, or other suitable type of wireless communications device or may be a device (portable or not portable) that is configured by a host operator to function with a single gateway, such as gateway 130. Communications device 104 includes an auto-provisioning element 116 and one or more identifiers, e.g., private SSIDs and keys 120. The auto-provisioning element 116 may include a signaling component that transmits/receives signals used to detect, or be detected by, an access point. According to an exemplary embodiment, the private SSID, and key 120 are used by the auto-provisioning system to control roaming of communications device 104 and are not accessible to the user of the communications device 104, e.g., by using encryption technologies or other similar security means. The auto-provisioning system ensures that the identifiers are secure, or tamper-proof, so that only authorized devices (e.g., under a service agreement) are able to receive the roaming controlled services described herein. By using, e.g., 802.11 standards which precludes devices from broadcasting the identifier and keys, the integrity of this information is protected and prevented from exposure to the public domain.

Various means may be employed to facilitate the auto-provisioning features. For example, the auto-provisioning element may use a feature on Broadcom® Wi-Fi (wireless fidelity) chips (e.g., SecureEasy Setup™). In this example, the auto-provisioning feature may control the setup process by electrical control via the network(s) 106 and the auto-provisioning application 114. When a network operator desires to pass identifiers and keys to a pair of devices (e.g., devices 104 and 110), the auto-provisioning application 114 may send the electrical signal to auto-provisioning element 116, which may send the appropriate electrical signal to the Broadcom chipset to initiate SecureEasy setup. The Wi-Fi devices (e.g., devices 104 and 110) are then associated and capable of passing communications; thus, they are provisioned. The auto-provisioning element 116 may include the capability to verify and authenticate the peer device(s) as the desired device to be provisioned and/or paired. It may do this, for example, by requesting information from the peer device such as a MAC (Media Access Control) address and verifying with the network via records in storage device 108. If the peered to device was not allowed, it might simply execute procedures to eliminate the pairing such as changing the security key.

In exemplary embodiments, the private SSID refers to a 32-character unique identifier associated with packets transmitted over a wireless network (e.g., 106) and which acts as a password when a wireless device initiates a connection with a basic service set (BSS). A BSS refers to an 802.11 networking framework whereby devices communicate with each other by first going through an access point (e.g., 110). The SSID differentiates between wireless networks, such that access points and communications devices attempting to connect to a particular network need to use the same SSID or will not be granted access to the BSS. The security keys are used to ensure the security of the network is maintained.

Also included in the system of FIG. 1 is a gateway 130 that further includes access point 110, a router (not shown), and a modem 112. Gateway 130 acts as a communications hub for communications device 104 to connect to a wireline network (e.g., one of networks 106). Access point 110 is configured to receive and transmit wireless signals (e.g., 802.11) to one or more devices such as communications device 104 or to an IP network (e.g., one of networks 106) via the router. The modem 112 connects the router to the wireline network (e.g., broadband network). The gateway 130 allows communication between a wireline network and wireless communications devices such as communications device 104, as well as between wireless communications devices. The access point 110 also includes one or more identifiers, e.g., private SSIDs, and keys 124. In alternative exemplary embodiments, the gateway 130, rather than the communications device 104, implements the auto-provisioning via the auto-provisioning elements in the access point 110 and the communications device 104. The access point 110 may be implemented by a hardware device or software element. For purposes of illustration, access point 110 comprises a private or non-commercial device that is used, for example, in a home. Additionally, while only one communications device 104 is shown in FIG. 1, it will be understood that multiple communications devices may be configured for use with the access point 110 in order to realize the advantages of the invention.

Also included in the system of FIG. 1 is a second gateway 128 that communicates with host system 102 over a wireline network, such as one of networks 106. Gateway 128 may comprise similar elements as those described with respect to the gateway 130. Gateway 128 may be located in a public location for use by customers or subscribers of the roaming controlled services described herein. For example, gateway 128 may be operated by the communications service provider of host system 102 or may be operated by a commercial establishment that is under agreement with the service provider to provide roaming controlled wireless network services. For purposes of illustration, gateway 128 refers to a "hot spot" that is configured to provide roaming controlled communications services to individuals with multi mode-enabled communications devices.

The roaming controlled communications services provided by host system 102 enable users of multi-mode communications devices to communicate over various networks. The roaming controlled services provided may allow users to save money by connecting to an access point, which in turn, connects the user's communications device to a target communications device via a wireline network (e.g., broadband) as opposed to a wireless network (e.g., cellular). The costs savings may be realized where the costs of communicating over a wireless network are greater than the costs of communicating over a wireline network. Additionally, in many situations, the quality of service provided via the wireline network may be generally better than the quality achieved through a wireless network.

In addition, these roaming controlled communications services may be remotely provisioned from a centralized system without any required action on the part of the end user. The auto-provisioning functions of the roaming controlled network system provide this capability.

Figure 2:
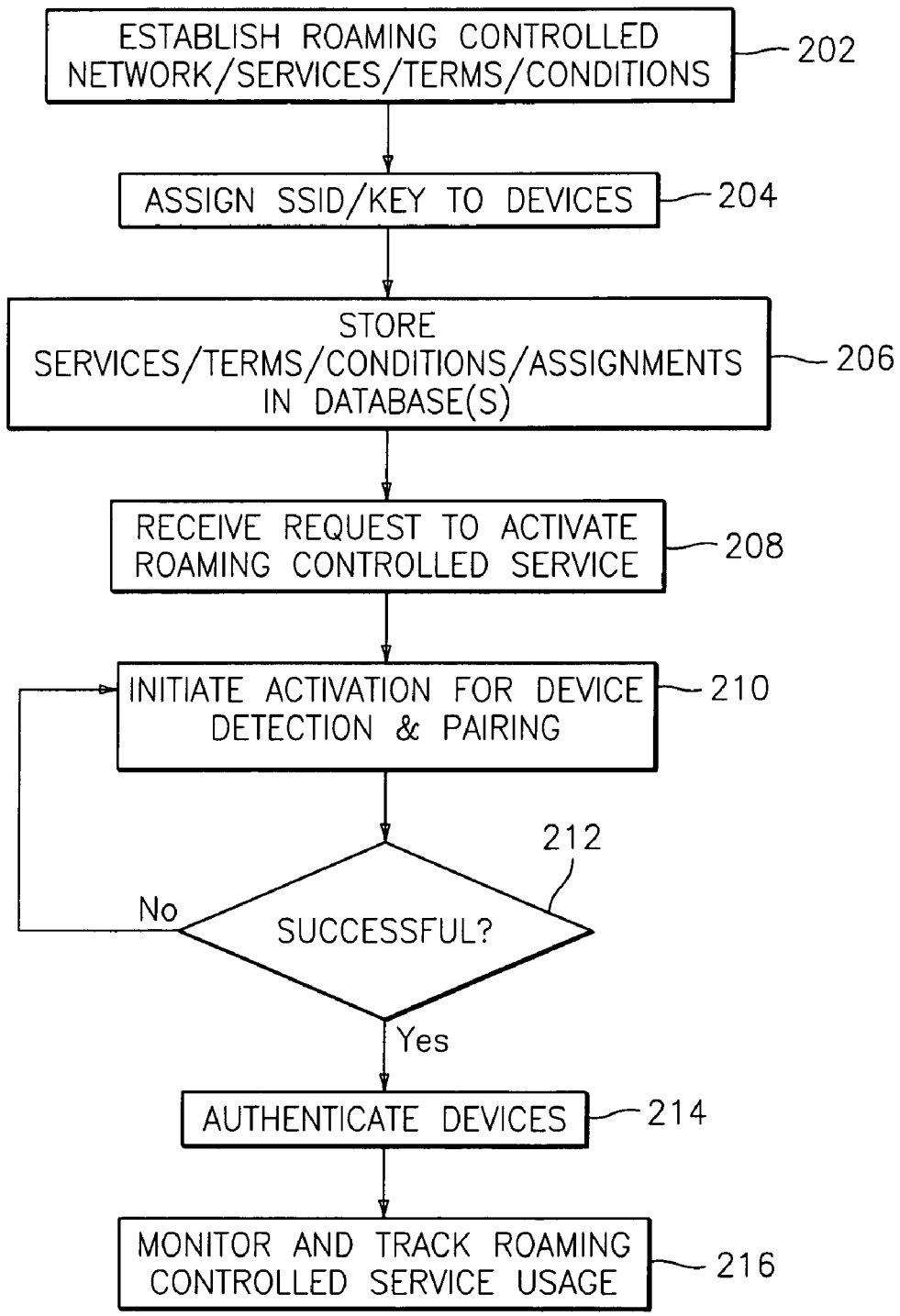
FIG. 2 is a flow diagram describing a process for implementing the roaming controlled wireless network including the auto-provisioning feature in exemplary embodiments.

Referring now to FIG. 2, a flow diagram describing a process for establishing a roaming controlled wireless network and implementing the auto-provisioning services will now be described in accordance with exemplary embodiments. At step 202, a user or operator at the host system 102 configures the auto-provisioned, roaming controlled wireless network, including related services, terms, and conditions. The services provided may include specified controlled roaming communications capabilities for an end user of a communications device while present at specified locations (e.g., access points), or may provide specified cost savings for controlled roaming usage at specified time periods (e.g., time of day). The services may also include providing cost savings for roaming controlled network usage implemented via partner networks or service provider entities, for which host system 102 has entered into an agreement.

Figure 3:
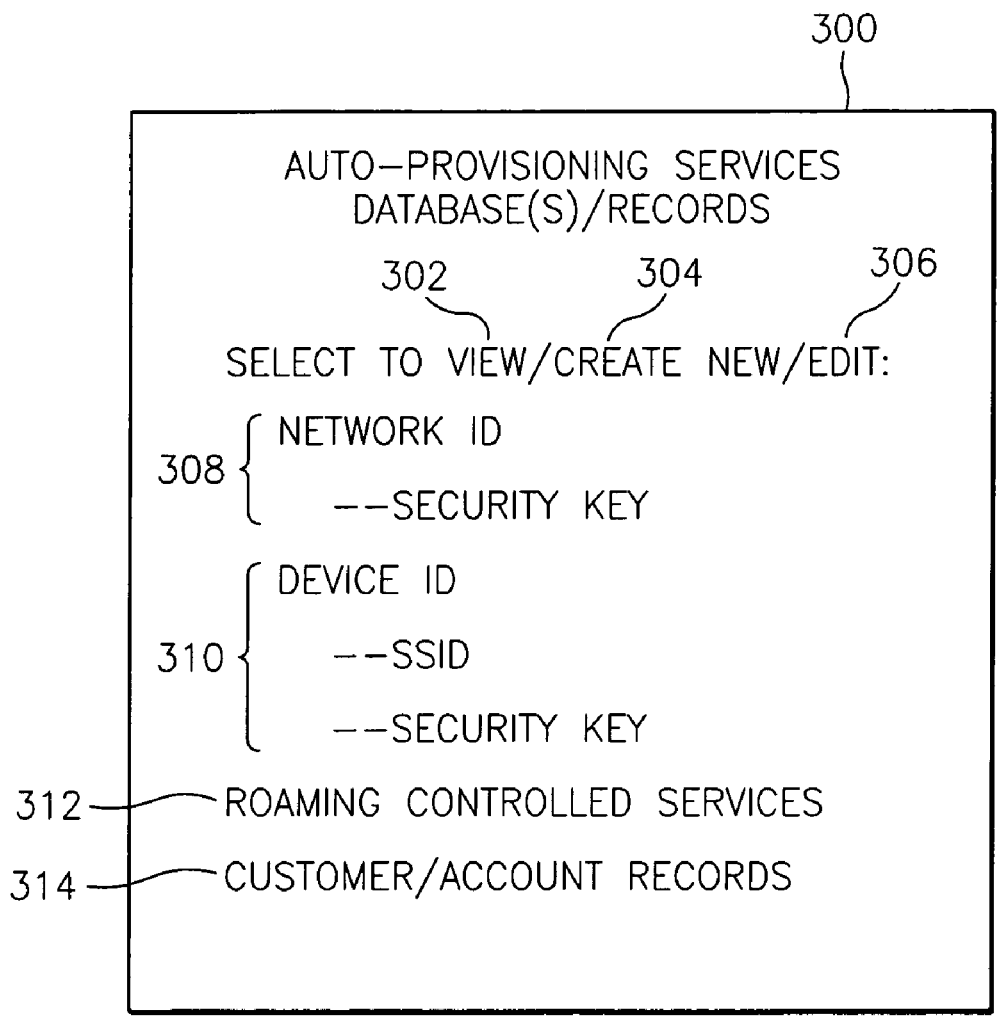
FIG. 3 is a user interface screen depicting sample options available via the roaming controlled wireless network system in exemplary embodiments.

These services, terms, and conditions may be established via the user interface of the auto-provisioning application 114, a sample of which is shown in FIG. 3. The user may determine which partner networks may be included in the services it offers to its customers. If host system 102 is a telecommunications service provider, the host system 102 may select partner/competitor telecommunications service provider networks that may be included in the service offerings in the event host system 102 customers travel out of network range. These selections may be determined via the CREATE NEW option 304 and NETWORK ID 308 option on the user interface screen 300 of FIG. 3. NETWORK ID 308 refers to a network classification scheme for uniquely identifying various networks, whether internal to the service provider or external (e.g., partner networks).

As indicated above, the host system 102 may determine the specific services it will offer with regard to the roaming controlled wireless network services. For example, the host system 102 may select CREATE NEW 304, DEVICE ID 310, and CUSTOMER/ACCOUNT RECORDS 314 for entering specific services for each customer, device, and/or account. As described above, services offered, e.g., may include free or low cost wireline network access for the communications device 104 when it initiates voice/data communications via gateway 130. The terms and conditions may vary from customer to customer and device to device, and may be affected by time of day, length of communication, and other criteria. Alternatively, services may be defined in a general manner by selecting the ROAMING CONTROLLED SERVICES option 312.

Once the roaming controlled network has been configured, each communications device and access point pair (e.g., 104, 110) is assigned at least one identifier, e.g., private SSID, and key, 120 and 124, respectively, neither of which are accessible to users of the device (e.g., customers, end users) at step 204. The information resulting from the activities conducted in steps 202 and 204 is stored in one or more databases in storage device 108 at step 206. The auto-provisioned, roaming controlled network is ready for utilization.

At step 208, the host system 102 receives a request to activate the roaming controlled services for a communications device (e.g., 104) and gateway (e.g., 130). This activation request may be implemented in a variety of ways (e.g., communications between the communications device 104 and the host system 102; a telephone request by a customer using, e.g., a toll-free activation number; a web page provided by the host system 102, etc.). The host system 102 initiates activation of the roaming controlled services at step 210 via the auto-provisioning application 114. This may be implemented by transmitting a signal to the auto-provisioning element 122 in gateway 130 via modem 112, which in turn, executes pairing of the SSID and security key by exchanging them between communications device 104 and access point 110 via the Wi-Fi connection. The activation may also include associating specific services, terms, and conditions with the communications device 104.

At step 212, it is determined whether the pairing is successful. This may be implemented by returning a positive/affirmative signal from the gateway 130 to the host system 102. If the pairing is not successful, future attempts to detect, or pair, the communications device 104 (e.g., additional signal transmission) may be effectuated by the host system 102 and the process returns to step 210.

If the pairing is successful at step 212, the auto-provisioning application 114 authenticates the communications device 104 and the gateway 130 at step 214. The authentication scheme may be implemented using Global System for Mobile communications (GSM) that enabled with Subscriber Identify Module (SIM). Alternatively, the authentication may be implemented using Extensile Authentication Protocol (EAP) SIM and 802.1x. Other suitable forms of authentication are contemplated by the roaming controlled network system as well.

Once the private SSIDs and keys have been exchanged between the communications device and gateway and all devices and services are authenticated, the user of the communications device 104 may utilize the multi-mode component of the communications device to connect with the access point 110, which in turn, enables the communications device 104 to communicate over the wireline network or to other communications devices in accordance with the terms of service provided by the communications service provider. Likewise, if the communications device 104 enters a "hot spot" that receives roaming controlled services provided by the host system 102, it may be remotely auto-provisioned by the host system 102 to communicate over a wireline network associated with the "hot spot" via a gateway (e.g., gateway 128). In exemplary embodiments, the auto-provisioning application 114 enables this communication by accessing a record that identifies the communications device 104 via storage device 108 and verifying the particular services, terms and conditions applicable for this device 104. Network usage for the communication may also be tracked by the auto-provisioning application 114.

The auto-provisioning application 114 enables a user of host system 102 to effectively monitor and track this multi-mode network usage by each of the communications devices it services for billing and other purposes at step 216.

Figure 4:
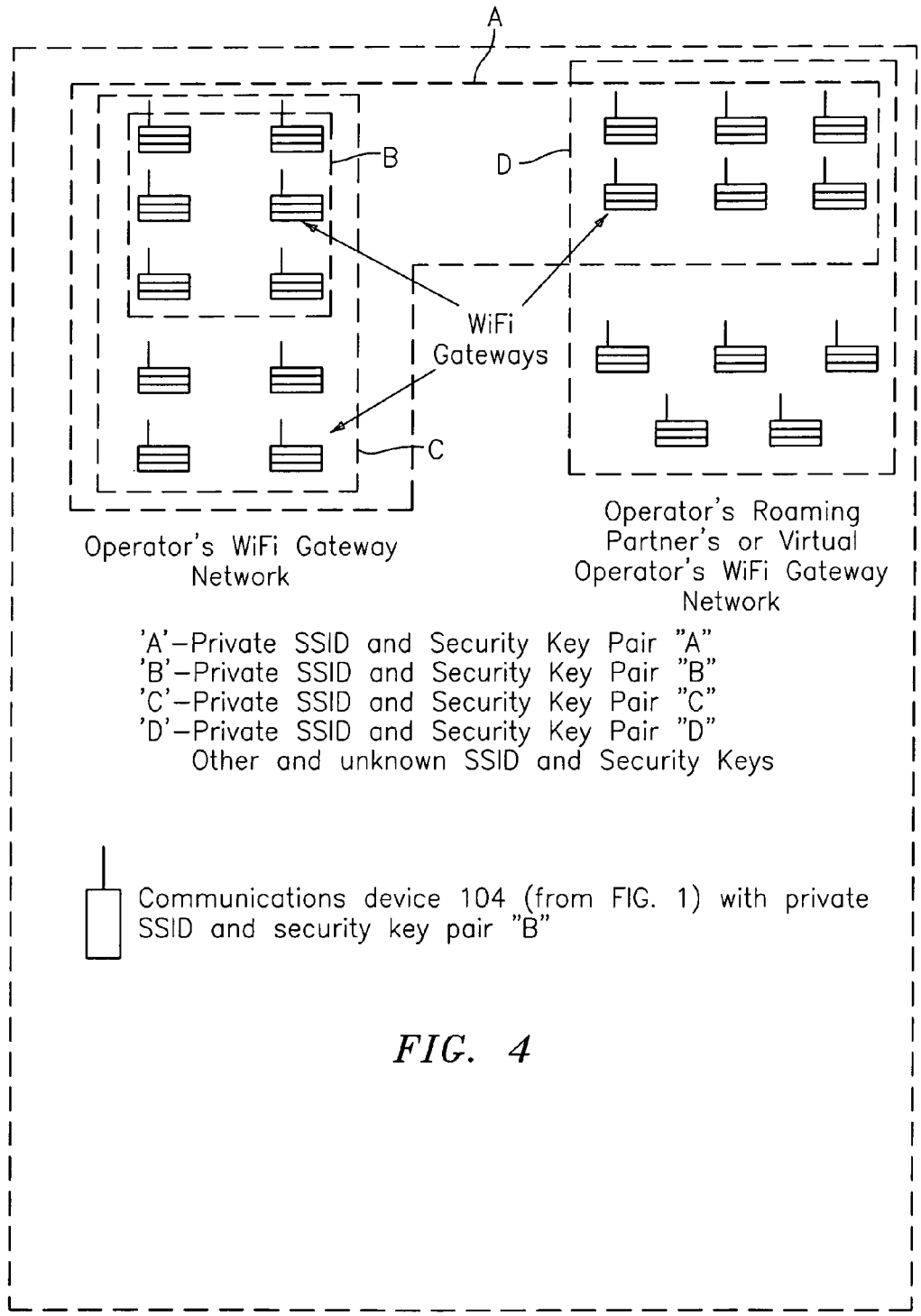
FIG. 4 is a diagram depicting a wide-scale network deployment of a roaming controlled wireless network and services in exemplary embodiments.

The auto-provisioning application 114 enables the user of host system 102 to disseminate identical private SSID and security key pairs to multiple communications devices and access points (e.g., 104 and 110) to form a community (or network) in which the communication device 104 will have wireless access (e.g., area in which the communication device 104 may roam). Likewise, by either not disseminating the applicable private SSID and security key pair to a gateway or, by disseminating (via the auto-provisioning application 114) different private SSID and security key pairs, the user of the host system 102 controls where communication device 104 may roam. As shown in FIG. 4, the communications device 104 is permitted only to roam only to those gateways 400 with private SSID and security key pair "B" and not to gateways 140 the operator has not distributed pair "B."

The user of host system 102 may deploy gateways (e.g., 128, 130, 140) and communication devices (e.g., 104) which can have multiple private SSIDs and security key pairs assigned to each unit. The user of host system 102 may then disseminate private SSID and security key pairs to form intersecting and non-intersecting unions of wireless (e.g., WiFi) access (e.g., tiered roaming capabilities). As shown in FIG. 4, communications device 104 is assigned private SSID and security key pair "B" and the user of host system 102 then disseminates the assigned pair "B" by using the auto-provisioning application 114. The "B" pair may have been previously disseminated to the gateways 400 or may also be distributed during the activation via the auto-provisioning application 114. Communications device 104 is then permitted access to all the gateways 400 that also have received pair "B," thus, allowing the operator to control roaming. The operator may use the auto-provisioning application 114 to provision other operator's gateways and communications devices as well.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for implementing a roaming controlled wireless network and services, comprising:

configuring a plurality of communities of wireless access networks, each community having a gateway device, wherein each gateway device within a community is assigned a first identical identifier and key pair, the first identical identifier and key pair defining the community as compared to others of the communities of wireless access networks; wherein the configuring further comprises assigning a second identical identifier and key pair to at least one of the gateways, the second identical identifier and key pair different from the first, the second identical identifier and key pair defining a second community in the wireless access networks;

assigning multiple identifier and key pairs to a multi-mode network-enabled communications device, each of the multiple identifier and key pairs corresponding to a community;

configuring a third community of wireless access networks by assigning a third identical identifier and key pair to a gateway device that is not within the first or second community, and assigning the third identical identifier and key pair, which third identical identifier and key pair is different than the first and second identical identifiers and key pairs, to one of the gateway devices that is part of at least one of the first and second communities; wherein the third identical identifier and key pair define the third community as overlapping the at least one of the first and second communities;

configuring an auto-provisioning element on at least one of the communication device and the gateway devices;

remotely provisioning activation of roaming controlled communications services for the end user of the communications device, without any required action by the end user, the remote provisioning including transmitting a signal to one of the communications device and the gateway device configured with the auto-provisioning element and which communications device and gateway device share an identical identifier and key pair, the signal causing the devices to exchange shared identical identifiers and key pairs via a wireless local network; and responsive to exchanging the identifiers and keys between the devices, permitting the communications device to communicate over the wireline network via the gateway device.

2. The method of claim 1, further comprising:

configuring services, terms, and conditions for the roaming controlled communications services; wherein the permitting the communications device to communicate over the wireline network includes:

retrieving a record from a database that identifies the communications device;

verifying the services, terms, and conditions specified in the record; and tracking network usage of the communications device occurring over the wireline network and implementing a billing system based upon the network usage.

3. The method of claim 2, wherein the services include
providing cost savings for controlled roaming communications usage during specified time periods by transitioning to lower cost wireline networks when the wireline network is available.

4. The method of claim 3, wherein the providing cost saving for controlled roaming communications usage during specified time periods is performed when the communications device initiates voice or data communications via the gateway device.

5. The method of claim 2, wherein the terms and conditions vary among at least one of:
customers;
communications devices;
time of day; and
duration of communication.

6. The method of claim 1, further comprising:
receiving a request to activate the roaming controlled communications services via at least one of:
a toll-free activation number; and
a web page provided by the service provider that provides the roaming controlled communications services.

7. A system for implementing a roaming controlled wireless network and services, comprising:
a host system in communication with a multi-mode network-enabled communications device and a plurality of gateway devices, each of the devices including an auto-provisioning element configured therein;
an auto-provisioning application executing on the host system, performing:
configuring a plurality of communities of wireless access networks, each community having a gateway device, wherein each gateway device within a community is assigned a first identical identifier and key pair, the first identical identifier and key pair defining the community as compared to others of the communities of wireless access networks; wherein the configuring further comprises assigning a second identical identifier and key pair to at least one of the gateways, the second identical identifier and key pair different from the first, the second identical identifier and key pair defining a second community in the wireless access networks;
assigning multiple identifier and key pairs to the multi-mode network-enabled communications device, each of the multiple identifier and key pairs corresponding to a community;
configuring a third community of wireless access networks by assigning third identical identifier and key pair to a gateway device that is not within the first or second community, and assigning the third identical identifier and key pair, which third identical identifier and key pair is different than the first and second identical identifiers and key pairs, to one of the gateway devices that is part of at least one of the first and second communities; wherein the third identical identifier and key pair define the third community as overlapping the at least one of the first and second communities;
remotely provisioning activation of roaming controlled communications services for the end user of the communications device, without any required action by the end user, the remote provisioning including transmitting a signal to the communications device and the gateway device configured with the auto-provisioning element and which communications device and gateway device share an identical identifier and key pair, the signal causing the devices to exchange shared identical identifiers and key pairs via a wireless local network; and
responsive to exchanging the identifiers and keys between the devices, permitting the communications device to communicate over the wireline network via the gateway device.

8. The system of claim 7, wherein the auto-provisioning application further performs:
configuring services, terms, and conditions for the roaming controlled communications services; wherein the permitting the communications device to communicate over the wireline network includes:
retrieving a record from a database that identifies the communications device;
verifying the services, terms, and conditions specified in the record; and
tracking network usage of the communications device occurring over the wireline network and implementing a billing system based upon the network usage.

9. The system of claim 8, wherein the services include
providing cost savings for controlled roaming communications usage during specified time periods by transitioning to lower cost wireline networks when the wireline network is available.

10. The system of claim 9, wherein the providing cost saving for controlled roaming communications usage during specified time periods is performed when the communications device initiates voice or data communications via the gateway device.

11. The system of claim 8, wherein the terms and conditions vary among at least one of:
customers;
communications devices;
time of day; and
duration of communication.

12. The system of claim 7, wherein the auto-provisioning application further performs:
receiving a request to activate the roaming controlled communications services via a toll-free activation number.

13. The system of claim 7, wherein the auto-provisioning application further performs:
receiving a request to activate the roaming controlled communications services via a web page provided by the service provider that provides the roaming controlled communications services.

14. A computer program product comprising a computer readable medium storing instructions for implementing a roaming controlled wireless network and services, comprising:
configuring a plurality of communities of wireless access networks, each community having a gateway device, wherein each gateway device within a community is assigned a first identical identifier and key pair, the first identical identifier and key pair defining the community as compared to others of the communities of wireless access networks; wherein the configuring further comprises assigning a second identical identifier and key pair to at least one of the gateways, the second identical identifier and key pair different from the first, the second identical identifier and key pair defining a second community in the wireless access networks;
assigning multiple identifier and key pairs to a multi-mode network-enabled communications device, each of the multiple identifier and key pairs corresponding to a community;

configuring a third community of wireless access networks by assigning a third identical identifier and key pair to a gateway device that is not within the first or second community, and assigning the third identical identifier and key pair, which third identical identifier and key pair is different than the first and second identical identifiers and key pairs, to one of the gateway devices that is part of at least one of the first and second communities; wherein the third identical identifier and key pair define the third community as overlapping the at least one of the first and second communities;

configuring an auto-provisioning element on at least one of the communications device and the gateway devices;

remotely provisioning activation of roaming controlled communications services for the end user of the communications device, without any required action by the end user, the remote provisioning including transmitting a signal to one of the communications device and the gateway device configured with the auto-provisioning element and which communications device and gateway device share an identical identifier and key pair, the signal causing the devices to exchange shared identical identifiers and key pairs via a wireless local network; and responsive to exchanging the identifiers and keys between the devices, permitting the communications device to communicate over the wireline network via the gateway device.

15. The computer program product of claim 14, further comprising instructions for implementing:

configuring services, terms, and conditions for the roaming controlled communications services; wherein the permitting the communications device to communicate over the wireline network includes:

retrieving a record from a database that identifies the communications device;

verifying the services, terms, and conditions specified in the record; and tracking network usage of the communications device occurring over the wireline network and implementing a billing system based upon the network usage.

16. The computer program product of claim 15, wherein the services include:

providing cost savings for controlled roaming communications usage during specified time periods by transitioning to lower cost wireline networks when the wireline network is available.

17. The computer program product of claim 16, wherein the providing cost saving for controlled roaming communications usage during specified time periods is performed when the communications device initiates voice or data communications via the gateway device.

18. The computer program product of claim 15, wherein the terms and conditions vary among at least one of:

customers;

communications devices;

time of day; and duration of communication.

19. The computer program product of claim 14, further comprising instructions for implementing:

receiving a request to activate the roaming controlled communications services via at least one of a toll-free activation number and a web page provided by the service provider that provides the roaming controlled communications services.

* * * * *